(12) United States Patent
Luo et al.

(10) Patent No.: US 10,739,967 B2
(45) Date of Patent: Aug. 11, 2020

(54) WINDOW MOVING METHOD OF MOBILE DEVICE AND APPARATUS THEREOF

(71) Applicant: BEIJING BYTEDANCE NETWORK TECHNOLOGY CO LTD., Beijing (CN)

(72) Inventors: Yonghao Luo, Beijing (CN); Bangsen Han, Beijing (CN)

(73) Assignee: BEIJING BYTEDANCE NETWORK TECHNOLOGY CO LTD., Beijing (CN)

(*) Notice: Subject to any disclaimer, the term of this patent is extended or adjusted under 35 U.S.C. 154(b) by 755 days.

(21) Appl. No.: 14/898,949

(22) PCT Filed: May 23, 2014

(86) PCT No.: PCT/CN2014/078237
§ 371 (c)(1),
(2) Date: Dec. 16, 2015

(87) PCT Pub. No.: WO2014/201936
PCT Pub. Date: Dec. 24, 2014

(65) Prior Publication Data
US 2016/0370977 A1  Dec. 22, 2016

(30) Foreign Application Priority Data

Jun. 20, 2013 (CN) .......................... 2013 1 0247009

(51) Int. Cl.
*G06F 3/0481* (2013.01)
*G06F 3/0484* (2013.01)
(Continued)

(52) U.S. Cl.
CPC ........ *G06F 3/04845* (2013.01); *G06F 3/0416* (2013.01); *G06F 3/0481* (2013.01); *G06F 3/04842* (2013.01); *G06F 3/04883* (2013.01)

(58) Field of Classification Search
CPC ............... G06F 3/0481; G06F 3/04883; G06F 2203/04803
(Continued)

(56) References Cited

U.S. PATENT DOCUMENTS 8,127,246 B2  2/2012 Furches et al.
8,769,431 B1 * 7/2014 Prasad .................... G06F 3/048
                                                        715/764
(Continued)

FOREIGN PATENT DOCUMENTS

CN  102306064 A  1/2012
CN  102520860 A  6/2012
(Continued)

OTHER PUBLICATIONS

International Searching Authority, International Search Report for International Application No. PCT/CN2014/078237, dated Aug. 22, 2014.

*Primary Examiner* — Namitha Pillai
(74) *Attorney, Agent, or Firm* — Mauriel Kapouytian Woods LLP; Michael Mauriel (57) ABSTRACT

A window moving method of a mobile device and system thereof is provided and includes receiving a message that a display screen of the mobile device is touched; obtaining the area of a touched point on the display screen; judging whether the area of the touched point is not smaller than a preset value and, if so, obtaining the current coordinates of the touched point; and moving the window to a location corresponding to the current coordinates of the touched point. According to the method, it is determined that the operation of pressing the display screen is not a traditional operation of clicking an icon; it is determined that the operation of pressing the display screen is an operation of moving a window; and finally the window is moved to the location corresponding to the current coordinates of the touched point.

12 Claims, 5 Drawing Sheets

(51) Int. Cl.
*G06F 3/0488* (2013.01)
*G06F 3/041* (2006.01)

(58) Field of Classification Search
USPC .................................................. 715/788, 798
See application file for complete search history.

(56) References Cited

U.S. PATENT DOCUMENTS

| | | | | |
|---|---|---|---|---|
| 2011/0037720 | A1* | 2/2011 | Hirukawa | G06F 3/0488 345/173 |
| 2011/0061021 | A1* | 3/2011 | Kang | G06F 3/0481 715/800 |
| 2013/0014035 | A1* | 1/2013 | Won, II | H04M 1/72552 715/758 |
| 2014/0289642 | A1* | 9/2014 | Prasad | G06F 3/048 715/745 |
| 2015/0124001 | A1 | 5/2015 | Zheng | |
| 2015/0296062 | A1* | 10/2015 | Lee | G02F 1/133345 455/566 |

FOREIGN PATENT DOCUMENTS

| | | |
|---|---|---|
| CN | 102981596 A | 3/2013 |
| CN | 103218117 A | 7/2013 |
| CN | 103294346 A | 9/2013 |
| CN | 103472996 A | 12/2013 |
| EP | 2587358 A2 | 5/2013 |

\* cited by examiner

WINDOW MOVING METHOD OF MOBILE DEVICE AND APPARATUS THEREOF

CROSS REFERENCE OF RELATED APPLICATION

The present disclosure is the national phase of International Application No. PCT/CN2014/078237, titled "WINDOW MOVING METHOD OF MOBILE DEVICE AND APPARATUS THEREOF", filed on May 23, 2014, which claims priority to Chinese Patent Application No. 201310247009.8, titled "WINDOW MOVING METHOD FOR MOBILE DEVICE AND APPARATUS THEREOF", filed on Jun. 20, 2013 with the State Intellectual Property Office of the People's Republic of China, both of which are incorporated herein by reference in their entirety.

FIELD

The present disclosure relates to the technical field of mobile communications, and in particular to a window moving method for a mobile device and an apparatus thereof.

BACKGROUND

At present, the display screen of a mobile phone is developed to become bigger and bigger, such as the display screen with a size of 3.5 inches, 4.3 inches or 5.3 inches. The user experience is enhanced using a mobile phone with a large-size display screen. The mobile phone may include a number of different windows, each of the windows may include a number of different icons, and the icons correspond to different applications. In a case that a user wants to start an application corresponding to an icon in a window, the user usually needs to switch to the window and then click the icon. In practice, for a mobile device with a large-size display screen, each of the windows includes a number of different icons, and the user cannot click all the icons in the window when holding the mobile device with a single hand. For example, in a case that the user holds the mobile phone with a large-size display screen with a single hand (holds the back of the mobile phone), the user can not touch all the icons in the window on the display screen of the mobile phone with the single hand (for example, in a case that the mobile phone is held with a right hand, fingers on the right hand usually cannot touch icons in the upper left corner of the display screen of the mobile phone; or, in a case that the mobile phone is held with a left hand, fingers on the left hand usually cannot touch icons in the upper right corner of the display screen of the mobile phone), thereby resulting in inconvenience of use.

In the conventional technology, this problem is solved by arranging a Menu button on a mobile phone using an Android system (the Menu button is arranged besides a Home button for some mobile phones). In some applications and systems, a small list is displayed at a location close to the bottom of the display screen of the mobile phone in a case that the Menu button is pressed, most or all of the icons in the window are included in the list, and applications corresponding to the icons in the list may be started by clicking these icons. However, the Menu button has a special function in some applications, and a small list of icons cannot be displayed in a location close to the bottom of the display screen of the mobile phone in a case that the Menu button is pressed during the use of these applications, that is, the way of arranging a Menu button is not compatible with all applications in the system.

To address this problem, an idea that a window on a display screen of a mobile phone can be moved to facilitate the user to click every icon in the window is proposed in the conventional technology. In practice, it is always a difficulty that how to move the window on the display screen of the mobile phone.

SUMMARY

In view of this, the object of the present disclosure is to provide a technical solution in which a window on a display screen of a mobile phone can be moved quickly and conveniently, so as to solve a defect in the conventional technology that the window on the display screen of the mobile phone cannot be moved.

To achieve the above object, a window moving method for a mobile device is provided according to an embodiment of the present disclosure, and the method includes:

receiving a message that a display screen of the mobile device is touched;

obtaining an area of a touched point on the display screen;

judging whether the area of the touched point is not smaller than a predetermined value, and obtaining current coordinates of the touched point in a case that the area of the touched point is not smaller than the predetermined value; and moving the window to a location corresponding to the current coordinates of the touched point.

Preferably, before the moving the window to a location corresponding to the current coordinates of the touched point, the method further includes:

obtaining initial coordinates of the touched point; and determining that the initial coordinates of the touched point are different from the current coordinates.

Preferably, before the moving the window to a location corresponding to the current coordinates of the touched point, the method further includes:

obtaining an initial instant corresponding to the initial coordinates of the touched point and a current instant corresponding to the current coordinates;

obtaining a moving speed of the touched point based on the initial instant, the current instant, and the initial coordinates and the current coordinates of the touched point; and determining that the moving speed of the touched point is not smaller than a preset value.

Preferably, before the moving the window to a location corresponding to the current coordinates of the touched point, the method further includes:

scaling down the window by a predetermined scaling factor; and the process of moving the window to a location corresponding to the current coordinates of the touched point includes:

moving the window scaled down by the predetermined scaling factor to the predetermined location.

Preferably, before the obtaining an area of a touched point on the display screen, the method further includes:

determining that the touched point is located in a blank region of the window.

Preferably, the method further includes:

receiving a message that the display screen of the mobile device is clicked;

obtaining an area of a clicked point on the display screen; and judging whether the area of the clicked point is not smaller than a predetermined threshold, and returning the window to an initial location in a case that the area of the clicked point is not smaller than the predetermined threshold.

Preferably, before the returning the window to an initial location, the method further includes:

obtaining starting coordinates and ending coordinates of the clicked point; and determining that the ending coordinates are closer to a central point of the display screen of the mobile device than the starting coordinates.

Preferably, the method further includes:

receiving a message that a blank region of the window on the display screen is clicked; and returning the window to an original location, where the original location is a location where a central point of the window coincides with a central point of the display screen.

Accordingly, a window moving system for a mobile device is further provided according to an embodiment of the present disclosure, and the system includes:

a first receiving unit, configured to receive a message that a display screen of the mobile device is touched;

a first obtaining unit, configured to obtain an area of a touched point on the display screen;

a first judging unit, configured to judge whether the area of the touched point is not smaller than a predetermined value;

a second obtaining unit, configured to obtain current coordinates of the touched point in a case that it is determined by the first judging unit that the area of the touch point is not smaller than the predetermined value; and a first moving unit, configured to move the window to a location corresponding to the current coordinates of the touched point.

Preferably, the system further includes:

a third obtaining unit, configured to obtain initial coordinates of the touched point; and a first determining unit, configured to determine that the initial coordinates of the touch points are different from the current coordinates.

Preferably, the system further includes:

a fourth obtaining unit, configured to obtain an initial instant corresponding to the initial coordinates of the touched point and a current instant corresponding to the current coordinates;

a fifth obtaining unit, configured to obtain a moving speed of the touched point based on the initial instant, the current instant, and the initial coordinates and the current coordinates of the touched point; and a second determining unit, configured to determine that the moving speed of the touched point is not smaller than a preset value.

Preferably, the system further includes:

a scaling unit, configured to scale down the window by a predetermined scaling factor, where the moving unit is configured to move the window scaled down by the predetermined scaling factor to a predetermined location.

Preferably, the system further includes:

a third determining unit, configured to determine that the touched point is located in a blank region of the window.

Preferably, the system further includes:

a second receiving unit, configured to receive a message that the display screen of the mobile device is clicked;

a sixth obtaining unit, configured to obtain an area of a clicked point on the display screen;

a third judging unit, configured to judge whether the area of the clicked point is not smaller than a predetermined threshold; and a first returning unit, configured to return the window to an initial location in a case that it is determined by the third judging unit that the area of the clicked point is not smaller than the predetermined threshold.

Preferably, the system further includes:

a seventh obtaining unit, configured to obtain starting coordinates and ending coordinates of the clicked point; and a fourth determining unit, configured to determine that the ending coordinates are closer to a central point of the display screen of the mobile device than the starting coordinates.

Preferably, the system further include:

a third receiving unit, configured to receive a message that a blank region of the window on the display screen is clicked; and a second returning unit, configured to return the window to an original location, where the original location is a location where a central point of the window coincides with a central point of the display screen.

Based on the window moving method for the mobile device and the system thereof according to the embodiments of the present disclosure, the area of the touched point is obtained in a case that the display screen is pressed, it is judged that the area of the touched point is not smaller than the predetermined value, and thus it is determined that the operation of pressing the display screen is not a traditional operation of clicking an icon; it is judged that the current coordinates of the touched point are different from the initial coordinates, and thus it is determined that the operation of pressing the display screen is an operation of moving a window; and finally the window is moved to the location corresponding to the current coordinates of the touched point, thereby realizing the movement of the window. The operation is simple, convenient and fast.

BRIEF DESCRIPTION OF THE DRAWINGS

In order to more clearly illustrate technical solutions in embodiments of the present disclosure or in the conventional technology, drawings used in the description of the embodiments or the conventional technology are introduced briefly hereinafter. Apparently, the drawings described in the following illustrates some embodiments of the present disclosure, other drawings may be obtained by those ordinarily skilled in the art based on these drawings without any creative efforts.

DETAILED DESCRIPTION OF THE EMBODIMENTS

In order to make the object, the technical solutions, and the advantages of embodiments of the present disclosure more clear, the technical solutions in the embodiments of the present disclosure are clearly and completely described hereinafter in conjunction with the drawings in the embodiments of the present disclosure. Apparently, the described embodiments are only a few of the embodiments of the present disclosure. Based on the embodiments of the present disclosure, all other embodiments obtained by those ordinarily skilled in the art without any creative efforts fall within the protection scope of the present disclosure.

In order to solve the problem in the conventional technology that a window on a display screen of a mobile phone cannot be moved, the embodiments of the present disclosure provide the technical solutions as follows.

Figure 1:
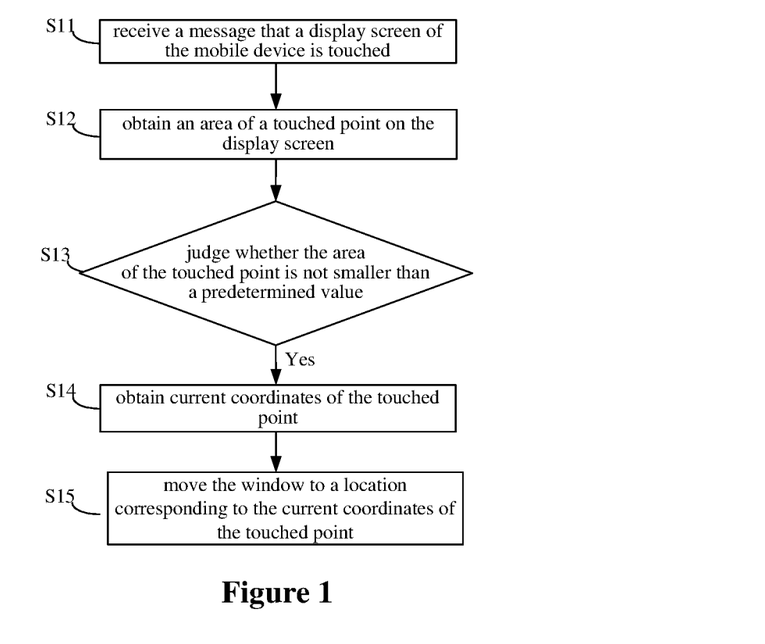
FIG. 1 is a schematic flow chart of a window moving method for a mobile device according to an embodiment of the present disclosure.

A window moving method for a mobile device is provided according to an embodiment of the present disclosure, and FIG. 1 shows a flow chart of the window moving method. The method includes the following steps S11 to S15.

In step S11, a message that a display screen of the mobile device is touched is received.

After the display screen of the mobile device is touched, the message may be received by a capacitive sensor or an inductive sensor inside the mobile device. Specifically, the message may be received by a driver layer in an operating system of the mobile device.

In step S12, an area of a touched point on the display screen is obtained.

After it is monitored that the display screen of the mobile device is pressed, the area of the touched point is obtained, and the area of the touched point is an area where the display screen of the mobile device is touched. For example, in a case that a user presses the display screen of the mobile device with a thumb, the area of the touched point is a contact area where the display screen of the mobile device is touched by the thumb.

In practical implementations, the area of the touched point may be obtained by the capacitive sensor or the inductive sensor inside the mobile device. In a case that the display screen of the mobile device is pressed, a capacitance variation or an inductance variation of a conductive film of the mobile device may be detected by the capacitive sensor or the inductive sensor inside the mobile device, and then the area of the touched point is obtained based on the capacitance variation or the inductance variation.

In step S13, it is judged (i.e., determined) whether the area of the touched point is not smaller than a predetermined value, and step S14 is performed in a case that the area of the touched point is not smaller than the predetermined value.

In order to distinguish the operation of pressing the display screen to move the window from the operation of pressing the display screen to realize a traditional click (for example, an operation of clicking an icon to start the application corresponding to the icon), the type of the operation of pressing the display screen may be determined based on the area of the touched point.

The user may set a predetermined value for the area of the touched point based on practical requirements. In a case that the area of the touched point is not smaller than the predetermined value, the current operation of pressing the display screen may be an operation to move the window. In a case that the area of the touched point is smaller than the predetermined value, the current operation of pressing the display screen is an operation to realize a traditional click (for example, an operation of clicking an icon to start the application corresponding to the icon).

In step S14, current coordinates of the touched point are obtained.

In the embodiments of the present disclosure, the coordinate system where the display screen of the mobile device is located is defined as a rectangular plane coordinate system, and a central point of the display screen is defined as the origin of the coordinate system. The current coordinates of the touched point is obtained, and the window can be moved to a corresponding location based on the current coordinates of the touched point.

In practical implementations, the current coordinates of the touched point may be obtained by a capacitive sensor or an inductive sensor inside the mobile device, which are not described in detail herein.

In step S15, the window is moved to a location corresponding to the current coordinates of the touched point.

Different current coordinates of the touched point correspond to different locations of the window (that is, the location of the window relative to the display screen is different). In a case that the coordinate system where the display screen of the mobile device is located is a rectangular plane coordinate system, the location of the window corresponding to the current coordinates (A1, B1) of the touched point is location 1, and the location of the window corresponding to the current coordinates (A2, B2) of the touched point is location 2. That is, in a case that the current coordinates of the touched point are (A1, B1), the window is moved to the location 1, or in a case that the current coordinates of the touched point are (A2, B2), the window is moved to the location 2.

In the embodiments of the present disclosure, a correspondence between the current coordinates of the touched point and locations of the window may be saved in the mobile device (specifically, the correspondence may be a correspondence between the current coordinates of the touched point and the locations of the central point of the window). After the current coordinates of the touched point are obtained, the location of the window is found correspondingly based on the current coordinates of the touched point, and then the window is moved to the location corresponding to the current coordinates of the touched point.

In addition, before the step S15 is performed, the following steps may be performed according to the embodiment of the present disclosure.

First, initial coordinates of the touched point are obtained.

It is judged whether the location of the touched point is changed based on the obtained initial coordinates and the current coordinates of the touched point. In a case that the initial coordinates are identical to the current coordinates, the operation of pressing the display screen is an operation to click the display screen, i.e., a "pressing" operation or a "raising" operation. In a case that the initial coordinates are different from the current coordinates, the operation of pressing the display screen is an operation to move the window, i.e., a "moving" operation.

Then, it is determined that the initial coordinates of the touched points are different from the current coordinates.

In a case that the initial coordinates of the touched point are different from the current coordinates, it represents that the location of the touched point is changed (for example, the location where the thumb presses the display screen of the mobile phone is changed to location B from location A), and the operation of pressing the display screen is an operation to move the window.

In this way, the window may be moved along various directions on the display screen of the mobile device, for example, the window may be moved left, right, up or down.

Therefore, the window may be moved to a location where all the icons in the window may be touched by the user's fingers based on user requirements.

Based on the window moving method for the mobile device according to the embodiments of the present disclosure, the area of the touched point is obtained in a case that the display screen is pressed, it is judged that the area of the touched point is not smaller than the predetermined value, and thus it is determined that the operation of pressing the display screen is not a traditional operation of clicking an icon; it is judged that the current coordinates of the touched point are different from the initial coordinates, and thus it is determined that the operation of pressing the display screen is an operation of moving a window; and finally the window is moved to the location corresponding to the current coordinates of the touched point, thereby realizing the movement of the window.

Moreover, the window moving method does not affect the running of any application within the mobile device, and can be compatible with all the applications in the mobile device.

Besides a Google's Android system, the window moving method may also be applied to a Symbian system, an Apple's IOS system, Microsoft's systems and other mobile phone operating systems. The operation of the window moving method is simple and easily implemented.

The window moving method according to the embodiments of the present disclosure may be implemented in various different ways, which are described in detail with the following examples. It should be noted that, these examples are used to illustrate rather than limit the technical solutions of the embodiments of the present disclosure. Based on the technical solutions in the embodiments of the present disclosure, all other technical solutions obtained without any creative efforts fall within the protection scope of the embodiments of the present disclosure.

First Embodiment

Figure 2:
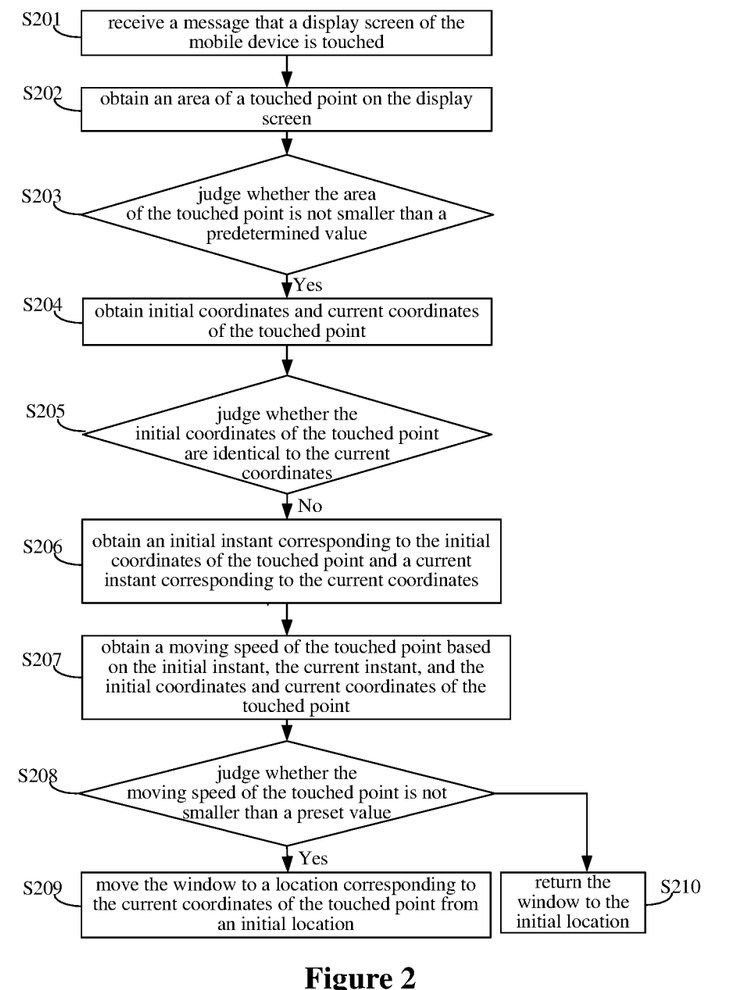
FIG. 2 is a schematic flow chart of a window moving method for a mobile device according to a first embodiment of the present disclosure.

A window moving method for a mobile device is provided according to the first embodiment of the present disclosure, and FIG. 2 is a flow chart of the method. In the following, a mobile phone is taken as an example to illustrate the method in detail, and the method includes the steps S201 to S210.

In step S201, a message that a display screen of the mobile device is touched is received.

After the display screen of the mobile device is touched, the message may be received by a capacitive sensor or an inductive sensor inside the mobile device. Specifically, the message may be received by a driver layer in an operating system of the mobile device.

In step S202, an area of a touched point on the display screen is obtained.

After it is monitored that the display screen of the mobile device is pressed, the area of the touched point is obtained, and the area of the touched point is an area where the display screen of the mobile device is touched. For example, in a case that a user presses the display screen of the mobile device with a thumb, the area of the touched point is a contact area where the thumb touches the display screen of the mobile device is touched by the thumb.

In practical implementations, the area of the touched point may be obtained by the capacitive sensor or the inductive sensor inside the mobile device. In a case that the display screen of the mobile device is pressed, a capacitance variation or an inductance variation of a conductive film of the mobile device may be detected by the capacitive sensor or the inductive sensor inside the mobile device, and then the area of the touched point is obtained based on the capacitance variation or the inductance variation.

In addition, before the step is performed, the following step may be performed: determining that the touched point is located in a blank region of the window. The window on the display screen of the mobile device includes a blank region and icon areas where the icons corresponding to applications are located, and there is no icon in the blank region. In traditional operations, an application corresponding to an icon may be started by clicking the icon, and no application is started by clicking on the blank region. It is determined that the touched point is located in the blank region of the window, which facilitate to avoid erroneous operations.

In step S203, it is judged whether the area of the touched point is not smaller than a predetermined value, and step S204 is performed in a case that the area of the touched point is not smaller than the predetermined value.

In order to distinguish the operation of pressing the display screen to move the window from the operation of pressing the display screen to realize a traditional click (for example, an operation of clicking an icon to start the application corresponding to the icon), the type of the operation of pressing the display screen may be distinguished based on the area of the touched point.

The user may set a predetermined value for the area of the touched point based on practical requirements. In a case that the area of the touched point is not smaller than the predetermined value, the current operation of pressing the display screen may be an operation to move the window. In a case that the area of the touched point is smaller than the predetermined value, the current operation of pressing the display screen may be an operation to realize a traditional click (for example, an operation of clicking an icon to start the application corresponding to the icon).

In step S204, initial coordinates and current coordinates of the touched point are obtained.

In the embodiment of the present disclosure, the coordinate system where the display screen of the mobile device is located is defined as a rectangular plane coordinate system, and a central point of the display screen is defined as the origin of the coordinate system. It is judged whether the location of the touched point is changed based on the obtained initial coordinates and the current coordinates of the touched point. In a case that the initial coordinates are identical to the current coordinates, the operation of pressing the display screen is an operation to click the display screen, i.e., a "pressing" operation or a "raising" operation. In a case that the initial coordinates are different from the current coordinates, the operation of pressing the display screen is an operation to move the window, i.e., a "moving" operation.

In practical implementations, the area of the touched point may be obtained by a capacitive sensor or an inductive sensor inside the mobile device.

In step S205, it is judged whether the initial coordinates of the touched point are identical to the current coordinates, and step S206 is performed in a case that the initial coordinates of the touched point are identical to the current coordinates.

In a case that the initial coordinates of the touched point are different from the current coordinates, it represents that the location of the touched point is changed (for example, the location where the thumb presses the display screen of the mobile phone is changed to location B from location A), and the operation of pressing the display screen is an operation to move the window.

In step S206, an initial instant corresponding to the initial coordinates of the touched point and a current instant corresponding to the current coordinates are obtained.

In a case that the initial coordinates of the touched point are different from the current coordinates, the operation of pressing the window is determined to be an operation to move the window. The initial instant T1 corresponding to the initial coordinates (A1, B1) of the touched point is different from the current instant T2 corresponding to the current coordinates (A2, B2).

In step S207, a moving speed of the touched point is obtained based on the initial instant, the current instant, and the initial coordinates and current coordinates of the touched point.

In a specific example, it may be assumed that the moving track of the touched point is straight, and then the moving speed of the touched point is a ratio of variation in coordinate values between the current coordinates and the initial coordinates to a different between the current instant and the initial instant.

In addition, a direction of moving the touched point may also be obtained, and the direction of moving the touched point is a direction of a vector between the current coordinates and the initial coordinates of the touched point.

In step S208, it is judged whether the moving rate of the touched point is not smaller than a preset value, step S209 is performed in a case that the moving speed of the touched point is not smaller than the preset value; otherwise, step S210 is performed.

In a case that the moving speed of the touched point is fast, the movement of the window cannot be immediately stopped because of inertia when the touched point stops moving. In this case, the entire window may be moved out of the display screen of the mobile phone. To avoid this case, it may be firstly judged whether the moving speed of the touched point is too fast, and the window is moved to a location corresponding to the current coordinates of the touched point in a case that the moving speed of the touched point is too fast, in order to avoid that the entire window is moved out of the display screen of the mobile phone.

In step S209, the window is moved to a location corresponding to the current coordinates of the touched point from an initial location.

Different current coordinates of the touched point correspond to different locations of the window (that is, the location of the window relative to the display screen is different). In a case that the coordinate system where the display screen of the mobile device is located is a rectangular plane coordinate system, the location of the window corresponding to the current coordinates (A1, B1) of the touched point is location 1, and the location of the window corresponding to the current coordinates (A2, B2) of the touched point is location 2. That is, in a case that the current coordinates of the touched point are (A1, B1), the window is moved to the location 1, and in a case that the current coordinates of the touched point are (A2, B2), the window is moved to the location 2.

In the embodiment of the present disclosure, a correspondence between the current coordinates of the touched point and locations of the window may be saved in the mobile device. For example, the current coordinates (A1, B1) of the touched point correspond to the location 1, and the current coordinates (A2, B2) of the touched point correspond to the location 2.

Specifically, in a case that the moving speed of the touched point is larger than preset value, the location corresponding to the current coordinates of the touched point may be a location where the window occupies a half of the display screen or a location where the window occupies two-thirds of the display screen, or any other location where the window is not entirely moved out of the display screen of the mobile phone.

In step S210, the window is returned to the initial location.

In a case that the moving speed of the touched point is too slow, the window is returned to the initial location.

With the window moving method for the mobile device according to the first embodiment of the present disclosure, the window can be moved based on the moving speed of the touched point, thereby avoiding that the window is entirely moved out of the display screen of the mobile phone because of inertia in a case that the moving speed of the touched point is too fast.

In addition, in a window moving method for a mobile device according to an embodiment of the present disclosure, the window may be scaled down and then be moved, which is described in detail in a second embodiment.

Second Embodiment

Figure 3:
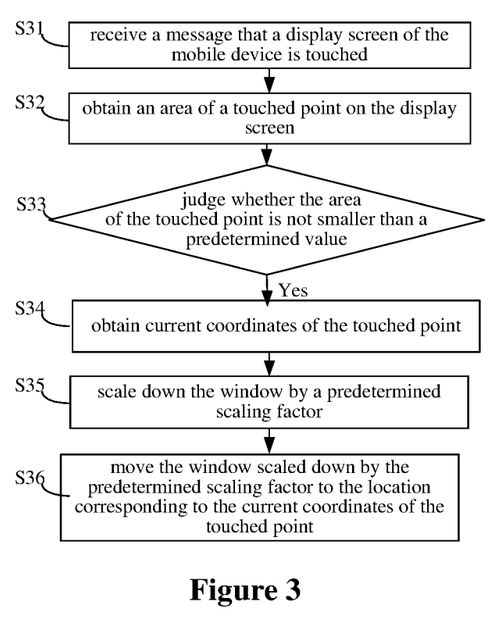
FIG. 3 is a schematic flow chart of a window moving method for a mobile device according to a second embodiment of the present disclosure.

FIG. 3 is a flow chart of a window moving method for a mobile device according to the second embodiment of the present disclosure. The method includes the steps S31 to S36.

It should be noted that, steps S31 to S34 in the second embodiment of the present disclosure are the same as the steps S11 to S14 in FIG. 1 according to the above embodiment, which are not described in detail herein. For the related contents, please refer to the description of the above embodiment.

In step S35, the window is scaled down by a predetermined scaling factor.

After the current coordinates of the touched point are obtained, the window may be moved based on the current coordinates of the touched point. In this case, the window may be scaled down by the predetermined scaling factor. The predetermined scaling factor is set as practical requirements, which is not limited herein.

In step S36, the window scaled down by the predetermined scaling factor is moved to a location corresponding to the current coordinates of the touched point.

Before the window is moved to the location corresponding to the current coordinates of the touched point, the window is scaled to decrease the overall size of the window, thereby facilitating the user to click conveniently every icon in the window.

In addition, other technical solutions may be obtained by combining the technical solutions in the second embodiment with the corresponding technical solutions in the above embodiments, which fall within the protection scope of the embodiments of the present disclosure.

In addition to the method of moving the window to the location corresponding to the current coordinates of the touched point (i.e., the required location), a method for returning the moved window to an initial location is provided, which is described in detail in a third embodiment.

Third Embodiment

Figure 4:
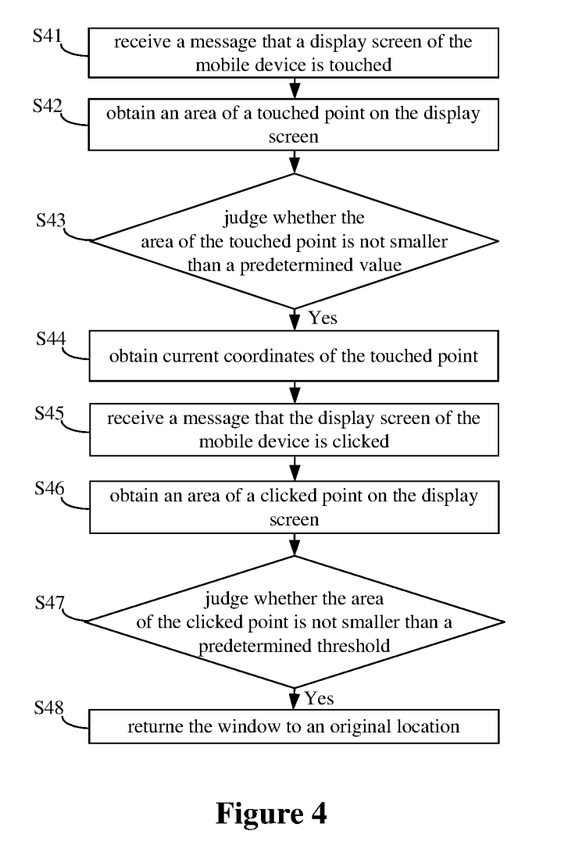
FIG. 4 is a schematic flow chart of a window moving method for a mobile device according to a third embodiment of the present disclosure.

Reference is made to FIG. 4, which is a flow chart of a window moving method for a mobile device according to the third embodiment of the present disclosure. The method includes the steps S41 to S48.

It should be noted that, the steps S41 to S44 in the third embodiment of the present disclosure can be the same as or correspond to the steps S11 to S14 in FIG. 1 according to the above embodiment, which are not described in detail herein. For the related contents, please refer to the description of the above embodiment.

In step S45, a message that the display screen of the mobile device is clicked is received.

After the display screen of the mobile device is clicked, the message may be received by a capacitive sensor or an inductive sensor inside the mobile device. Specifically, the message may be received by a driver layer in an operating system of the mobile device.

In step S46, an area of a clicked point on the display screen is obtained.

The user may move the window to an original location from the current location by clicking the display screen, and the original location is a location where a central point of the window coincides with a central point of the display screen (i.e., the location of the window in a usual state). Specifically, it is judged whether the operation of clicking the display screen is a traditional operation of clicking an icon or an operation of moving the window, based on the area of the clicked point. The area of the clicked point may be an area where the display screen of the mobile phone is touched by the thumb.

In step S47, it is judged whether the area of the clicked point is not smaller than a predetermined threshold, and step S48 is performed in a case that the area of the clicked point is not smaller than the predetermined threshold.

In a case that the area of the clicked point is smaller than the predetermined threshold, it represents that the operation of clicking the display screen is a tradition operation of clicking an icon or a blank region of the window. In a case that the area of the clicked point is larger than or equal to the predetermined threshold, it represents that the operation of clicking the display screen is an operation of moving the window.

The predetermined threshold herein may be set based on user requirements, and may be the same as the predetermined value in the above embodiment or not, which is not limited herein.

In step S48, the window is returned to an original location.

Based on the steps S45 to S47, it is determined that the operation of clicking the display screen is an operation of moving the window by determining that the area of the clicked point is larger than or equal to the predetermined threshold, and then the window is returned to the original location.

In addition, the window may be returned to the original location in other ways according to the embodiments of the disclosure. For example, before step S48 is performed, the following steps (including step (i) and step (ii), which are not illustrated in the FIG. 4) may be performed.

In step (i), starting coordinates and ending coordinates of the clicked point are obtained.

The starting coordinates are the coordinates where the user starts to click the display screen in a case that the window is located in the current location, and the ending coordinates are the coordinates where the user ends clicking the display screen in a case that the window is located in the current location.

In step (ii), it is determined that the ending points are closer to the central point of the display screen than the starting point.

The coordinate system where the display screen of the mobile phone is located is defined as a rectangular plane coordinate system, and the central point of the display screen of the mobile phone is defined as the origin of coordinate system. It may be judged whether the ending points are closer to the central point of the display screen than the starting point based on the coordinate values of the ending coordinates and the starting coordinates of the clicked point. In a case that the ending coordinates are closer to the central point of the display screen than the starting coordinates, it represents that the clicked point is moved towards the central point of the display screen, and the window is returned to the original location accordingly.

Based on the above steps, it is determined that the operation of clicking the display screen is an operation of moving the window by determining that the area of the clicked point is larger than or equal to the predetermined threshold, then it is determined that the ending coordinates are closer to the central point of the display screen of the mobile phone than the starting coordinates, and the window is returned to the original location.

In addition, the method of returning the window to the original location in the steps S45 to S48 according to the third embodiment of the present disclosure may also be implemented through the following steps (1) and (2).

In step (1), a message that a blank region of the window is clicked is received.

After the window is moved based on the steps S41 to S44, a part of the window is moved out of the display screen, and the other part of the window is still on the display screen. In this case, the operation of returning the window to the original location may be triggered in a case that a blank region of the window on the display screen is clicked.

In step (2), the window is returned to the original location from the current location.

It should be noted that, other technical solutions may obtained by combining the steps S45 to S47 in the third embodiment of the present disclosure and the technical solutions in the first embodiment or the second embodiment, which fall within the protection scope of the embodiments of the present disclosure.

In addition, other technical solutions may obtained by combining the steps (i) to (ii) or steps (1) to (2) in the third embodiment of the present disclosure and the technical solutions in the first embodiment or the second embodiment, which fall within the protection scope of the embodiments of the present disclosure and are not described herein.

In addition, the window moving method for the mobile device according to the embodiments of the present disclosure may also be implemented in other ways, for example, by means of a button or voice, which is not described herein.

Figure 5:
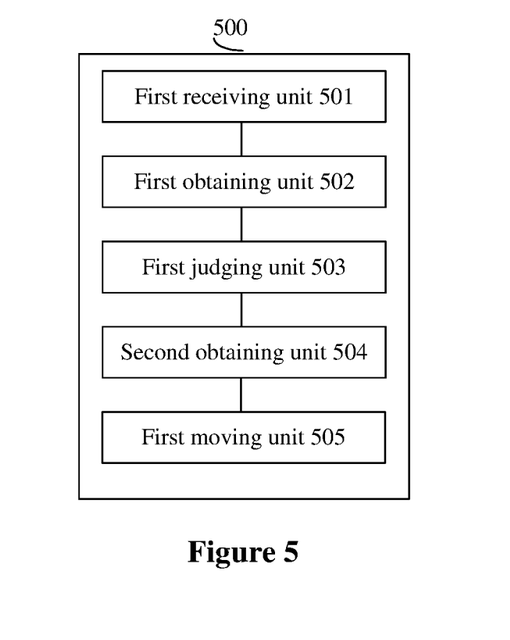
FIG. 5 is a schematic structural diagram of a window moving system for a mobile device according to an embodiment of the present disclosure.

In addition, a window moving system for a mobile device is further provided according to an embodiment of the present disclosure, and FIG. 5 is a schematic structural diagram of the system. The system 500 includes:

a first receiving unit 501 configured to receive a message that a display screen of the mobile device is touched;

a first obtaining unit 502 configured to obtain an area of a touched point on the display screen;

a first judging unit 503 configured to judge whether the area of the touched point is not smaller than a predetermined value;

a second obtaining unit 504 configured to obtain current coordinates of the touched point in a case that it is determined by the first judging unit that the area of the touch point is not smaller than the predetermined value; and a first moving unit 505 configured to move the window to a location corresponding to the current coordinates of the touched point.

Furthermore, the window moving system for the mobile device according to the embodiment of the present disclosure may further include:

a third obtaining unit, configured to obtain initial coordinates of the touched point;

a first determining unit configured to determine that the initial coordinates of the touch points are different from the current coordinates;

a fourth obtaining unit configured to obtain an initial instant corresponding to the initial coordinates of the touched point and a current instant corresponding to the current coordinates;

a fifth obtaining unit configured to obtain a moving speed of the touched point based on the initial instant, the current instant, and the initial coordinates and the current coordinates of the touched point;

a second determining unit configured to determine that the moving speed of the touched point is not smaller than a preset value;

a scaling unit configured to scale down the window by a predetermined scaling factor, where the moving unit is configured to move the window scaled down by the predetermined scaling factor to a predetermined location;

a third determining unit configured to determine that the touched point is located in a blank region of the window;

a second receiving unit configured to receive a message that the display screen of the mobile device is clicked;

a sixth obtaining unit configured to obtain an area of a clicked point on the display screen;

a third judging unit configured to judge whether the area of the clicked point is not smaller than a predetermined threshold;

a first returning unit configured to return the window to an initial location in a case that it is determined by the third judging unit that the area of the clicked point is not smaller than the predetermined threshold;

a seventh obtaining unit configured to obtain starting coordinates and ending coordinates of the clicked point;

a fourth determining unit configured to determine that the ending coordinates are closer to the central point of the display screen of the mobile device than the starting coordinates;

a third receiving unit configured to receive a message that a blank region of the window is clicked; and a second returning unit configured to return the window to an original location, where the original location is a location where the central point of the window coincides with the central point of the display screen.

Based on the window moving method for the mobile device and the system thereof according to the embodiments of the present disclosure, with the system, the area of the touched point is obtained in a case that the display screen is pressed, it is judged that the area of the touched point is not smaller than the predetermined value, thus it is determined that the operation of pressing the display screen is not a traditional operation of clicking an icon; it is judged that the current coordinates of the touched point are different from the initial coordinates, and thus it is determined the operation of pressing the display screen is an operation of moving a window; and finally the window is moved to the location corresponding to the current coordinates of the touched point, thereby realizing the movement of the window. The operation is simple, convenient and fast.

The above descriptions are only preferred embodiments of the present disclosure. It should be noted that various changes and modifications can be made by those ordinarily skilled in the art without departing from the principle of the present disclosure, which fall within the protection scope of the present disclosure.

What is claimed is:

1. A window moving method for a mobile device, comprising:

receiving a message that a touch is detected on a display screen of the mobile device;

obtaining a contact area of the touch with the display screen, wherein the contact area of the touch is an area of a zone where a finger of a user contacts with the display screen of the mobile device in a case that the user presses the display screen of the mobile device with the finger;

determining whether the contact area of the touch is not smaller than a predetermined value; and in response to determining that the contact area of the touch is not smaller than the predetermined value:

determining that the touch corresponds to an operation to move the window instead of a click operation;

obtaining current coordinates of the touch; and scaling down the window by a predetermined scaling factor and moving the window scaled down by the predetermined scaling factor to a location corresponding to the current coordinates of the touch;

receiving a message that a click on the display screen of the mobile device is detected;

obtaining a contact area of the click on the display screen, wherein the contact area of the click is an area of a point where the finger of the user clicks on the screen; and determining whether the contact area of the click is not smaller than a predetermined threshold, and returning the window to an initial location in a case that the contact area of the click is not smaller than the predetermined threshold, wherein the predetermined threshold is different from the predetermined value, and wherein the initial location is a location where a central point of the window coincides with a central point of the display screen.

2. The window moving method according to claim 1, wherein before the moving the window to a location corresponding to the current coordinates of the touch, the method further comprises:

obtaining initial coordinates of the touch; and determining that the initial coordinates of the touch are different from the current coordinates.

3. The method according to claim 2, wherein before the moving the window to a location corresponding to the current coordinates of the touch, the method further comprises:

obtaining an initial instant corresponding to the initial coordinates of the touch and a current instant corresponding to the current coordinates;

obtaining a moving speed of the touch based on the initial instant, the current instant, and the initial coordinates and the current coordinates of the touch; and determining that the moving speed of the touch is not smaller than a preset value.

4. The method according to claim 1, wherein before the obtaining the contact area of the touch on the display screen, the method further comprises determining that the touch is located in a blank region of the window.

5. The method according to claim 1, wherein before the returning the window to an initial location, the method further comprises:
    obtaining starting coordinates and ending coordinates of the click; and
    determining that the ending coordinates are closer to a central point of the display screen of the mobile device than the starting coordinates.

6. The method according to claim 1, further comprising:
    receiving a message that a blank region of the window on the display screen is clicked; and
    returning the window to an original location, wherein the original location is a location where a central point of the window coincides with a central point of the display screen.

7. A window moving system for a mobile device comprising:
    a processor; and
    a memory storing one or more programs stored in the memory, the one or more programs, when executed by the processor, are configured to cause the processor to:
        receive a message that a touch is detected on a display screen of the mobile device;
        obtain a contact area of the touch with the display screen, wherein the contact area of the touch is an area of a zone where a finger of a user contacts with the display screen of the mobile device in a case that the user presses the display screen of the mobile device with the finger;
        determine whether the contact area of the touch is not smaller than a predetermined value; and
        in response to determining that the contact area of the touch is not smaller than the predetermined value:
            determine that the touch corresponds to an operation to move the window instead of a click operation;
            obtain current coordinates of the touch; and
            scale down the window by a predetermined scaling factor and move the window scaled down by the predetermined scaling factor to a location corresponding to the current coordinates of the touch;
        receive a message that a click on the display screen of the mobile device is detected;
        obtain a contact area of the click on the display screen, wherein the contact area of the click is an area of a point where the finger of the user clicks on the screen; and
        determine whether the contact area of the click is not smaller than a predetermined threshold; and
        return the window to an initial location in a case that the contact area of the click is not smaller than the predetermined threshold, wherein the predetermined threshold is different from the predetermined value, and wherein the initial location is a location where a central point of the window coincides with a central point of the display screen.

8. The window moving system according to claim 7, wherein the one or more programs, when executed by the processor, are further configured to cause the processor to:
    obtain initial coordinates of the touch; and
    determine that the initial coordinates of the touch are different from the current coordinates.

9. The system according to claim 8, wherein the one or more programs, when executed by the processor, are further configured to cause the processor to:
    obtain an initial instant corresponding to the initial coordinates of the touch and a current instant corresponding to the current coordinates;
    obtain a moving speed of the touch based on the initial instant, the current instant, and the initial coordinates and the current coordinates of the touch; and
    determine that the moving speed of the touch is not smaller than a preset value.

10. The system according to claim 7, wherein the one or more programs, when executed by the processor, are further configured to cause the processor to determine that the touch is located in a blank region of the window.

11. The system according to claim 7, wherein the one or more programs, when executed by the processor, are further configured to cause the processor to:
    obtain starting coordinates and ending coordinates of the click; and
    determine that the ending coordinates are closer to a central point of the display screen of the mobile device than the starting coordinates.

12. The system according to claim 7, wherein the one or more programs, when executed by the processor, are further configured to cause the processor to:
    receive a message that a blank region of the window on the display screen is clicked; and
    return the window to an original location, wherein the original location is a location where a central point of the window coincides with a central point of the display screen.

* * * * *